US009113187B2

(12) United States Patent
Conroy et al.

(10) Patent No.: US 9,113,187 B2
(45) Date of Patent: Aug. 18, 2015

(54) FFT TAP WIFI EXTENSION DEVICE

(71) Applicant: ARRIS Enterprises, Inc., Suwanee, GA (US)

(72) Inventors: Dennis P. Conroy, Sellersville, PA (US); Joseph M. Colussi, Chalfont, PA (US); David C. Hartum, Springfield, PA (US); Christopher E. Jeblonski, Hatboro, PA (US); Jamie J. Swift, Levittown, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 26 days.

(21) Appl. No.: 14/017,341

(22) Filed: Sep. 4, 2013

(65) Prior Publication Data
US 2015/0067755 A1 Mar. 5, 2015

(51) Int. Cl.
*H04N 7/16* (2011.01)
*H04N 21/41* (2011.01)
*H04N 21/61* (2011.01)
*H04N 21/647* (2011.01)

(52) U.S. Cl.
CPC ........... *H04N 21/41* (2013.01); *H04N 21/6156* (2013.01); *H04N 21/6168* (2013.01); *H04N 21/64707* (2013.01)

(58) Field of Classification Search
CPC ............. H04L 23/49827; H04L 20/65; H04N 21/64707; H04N 21/647
USPC ....................................... 725/149; 174/50–64
See application file for complete search history.

(56) References Cited

U.S. PATENT DOCUMENTS

| 5,909,154 | A | * | 6/1999 | Brown et al. | 333/100 |
| 5,945,634 | A | * | 8/1999 | Shimirak et al. | 174/71 C |
| 6,066,801 | A | * | 5/2000 | Kodaira et al. | 174/41 |
| 6,068,511 | A | * | 5/2000 | Hsiang | 439/579 |
| 6,157,810 | A | * | 12/2000 | Georges et al. | 455/11.1 |
| 6,560,778 | B1 | * | 5/2003 | Hasegawa | 725/149 |
| 2004/0172664 | A1 | * | 9/2004 | Rocci et al. | 725/149 |
| 2013/0067509 | A1 | * | 3/2013 | Talbert | 725/31 |

OTHER PUBLICATIONS

BelAir Networks "Belair100SP Strand Picocell", retrieved from URL<http://www.linkedin.com/company/belair-networks/belair100sp-strand-picocell-83815/product?trk=biz_product> on Jan. 27, 2014.

* cited by examiner

*Primary Examiner* — Pankaj Kumar
*Assistant Examiner* — Timothy Newlin
(74) *Attorney, Agent, or Firm* — Lori Anne D. Swanson

(57) ABSTRACT

Techniques for adding WiFi capabilities to a region may include installing WiFi access points in a cable television (CATV) system. For easier installation of the WiFi access points, a WiFi access point extension devices may be integrated into existing taps in the CATV system. The WiFi extended taps are able to provide radio frequency (RF)/CATV signals to subscribers, provide power to the respectively integrated WiFi access point, and maintain power to the coaxial transmission line during installation. During installation, the WiFi access point extension devices can be integrated into the CATV outdoor distribution plant without having to splice into an existing coaxial transmission line. The multiplicity of existing tap locations in CATV distribution plants makes the positioning of new wireless access points extremely versatile for the cable provider.

18 Claims, 7 Drawing Sheets

FFT TAP WIFI EXTENSION DEVICE

BACKGROUND

As the expansion of data-traffic growth explodes, macro cellular networks are no longer sufficient to meet subscriber demands, particularly in high-density, high-traffic areas. Some mobile network providers have implemented traditional solutions to date which consist of building out their existing macro cellular network. However, adding base stations and cell towers to expand WiFi capabilities to more users requires a significant amount of real estate (which is limited to begin with), are expensive to deploy, and are often aesthetically unappealing. An alternate solution for small cell technology includes installing a mesh architecture of smaller base stations, or stand-alone wireless access assemblies.

Deploying cost-effective, reliable backhaul to small base stations remains a challenge for operators. For example, network planning issues, getting backhaul transmission, installation, cost, and access to power are some of the more difficult challenges operators face when it comes to deploying public access small cells.

In some solutions, stand-alone assemblies are integrated with a hybrid fiber/coax infrastructure by cutting into the fiber/coax line and mounting the stand-alone assembly on to a strand of the cable plant. To minimize cost and installation requirements, a key driver behind small cell WiFi solutions has been to serve as many subscribers as possible while installing as few access points as possible. Thus, while small cell access points may be installed in a distributed architecture, the stand-alone assemblies are installed in locations typically centralized locations within major population zones. However, often the assemblies are not scaled properly in light of the limited distant transmission of smaller cell technology.

On the other hand, deploying more small-cell nodes for proper coverage requires excessive costs if present solutions are used for mounting the devices throughout an area. For example, the currently used assemblies often requires a robust support structure and access to power, such as attaching the assemblies to a utility pole and using the pole's external outlet. The assemblies are also bulky and usually require multiple contractors to install the assembly, typically requiring a cut in the coax line. Even for assemblies designed to hang off of a hybrid fiber/coax infrastructure, installation requires a cut in the coax line for insertion of the assembly. Thus, installation requires a shutdown of the main feeder coaxial cable line, causing an interruption of service to any users along that feeder line in the network.

Thus, it is not economically practical using current solutions to install as many of the stand-alone wireless access assemblies in a hybrid fiber/coax infrastructure that would be necessary for proper coverage of large areas or high-traffic areas. While existing stand-alone assemblies deployed may be smaller than a cell tower, the assemblies are still costly and significant in size, and installation is costly, both monetarily and due to the interruption of service to any downstream subscribers along a feeder line in the fiber/coax infrastructure.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

DETAILED DESCRIPTION

Disclosed herein are techniques for installing WiFi access points in a cable television (CATV) system while maintaining services to subscribers. In embodiments, WiFi access point extension devices are integrated into taps in the CATV system to incorporate WiFi access points in to the CATV system. The WiFi-extended taps are able to provide radio frequency (RF)/CATV signals to subscribers, provide power to the respectively integrated WiFi access point, and maintain power to the coaxial transmission line during installation. The disclosed WiFi access point extension devices can be integrated with a CATV outdoor distribution plant without having to splice into an existing coaxial transmission line. Further, the WiFi access point extension devices can be combined with taps in the CATV outdoor distribution plant in such a manner that existing tap functionality is preserved. The multiplicity of existing tap locations in CATV distribution plants makes the positioning of new wireless access points extremely versatile for the cable provider.

Figure 1A:
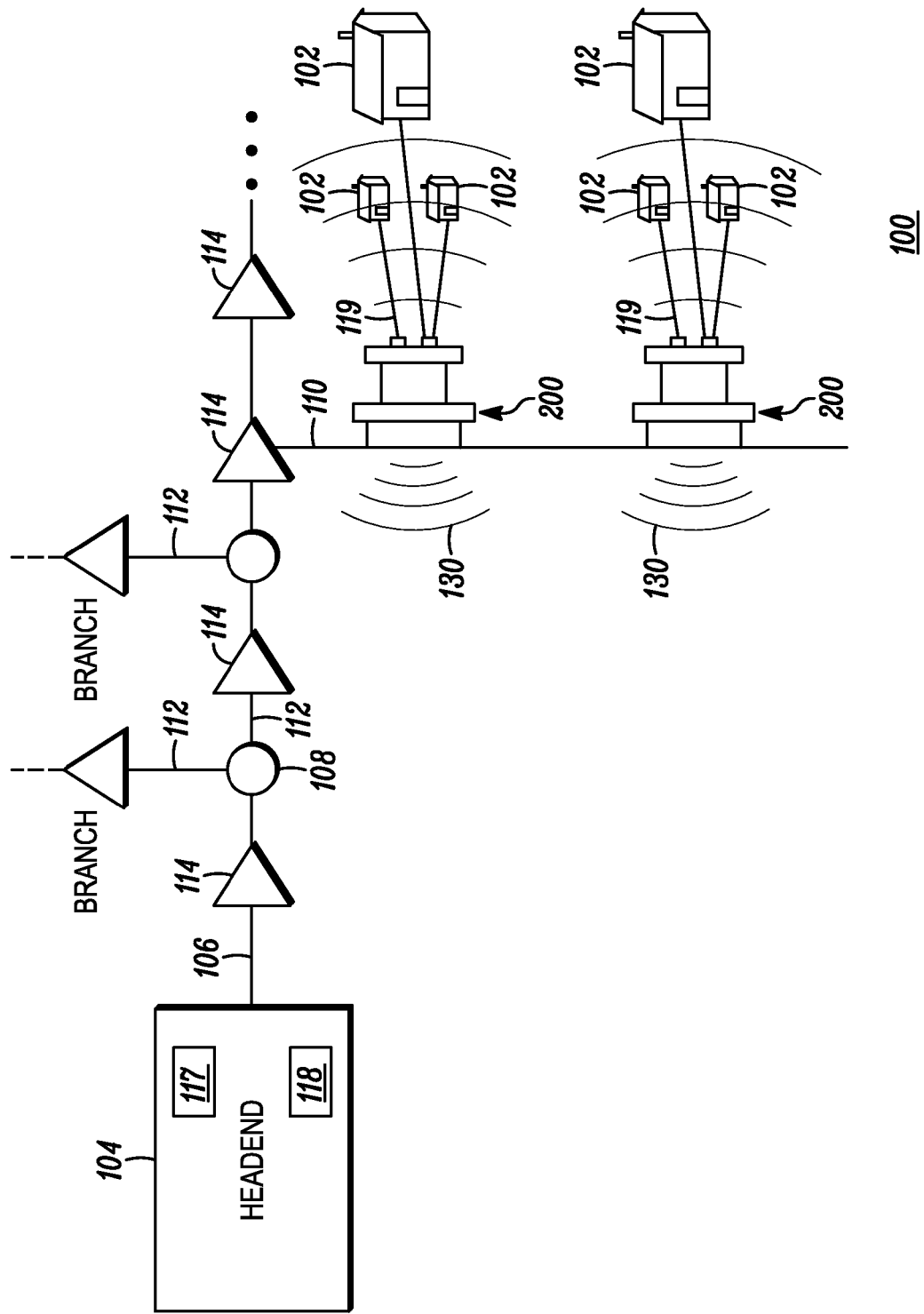
FIG. 1A depicts a cable television (CATV) distribution plant 100 that connects a headend 104 to a plurality of subscribers through subscriber terminals 102 (e.g., subscriber CATV terminals)

FIG. 1A depicts a CATV transmission distribution plant 100 that connects a cable television (CATV) headend 104 to a plurality of subscribers 102 through subscriber terminals (e.g., subscriber CATV terminals). The headend 104 transmits CATV signals through a transmission network to the plurality of subscribers 102 located remotely from the head end 104.

The transmission network of a CATV distribution plant 100 includes coaxial cables, signal couplers/splitters, amplifiers, and subscriber taps for distributing television signals downstream from the headend 104 to the subscribers 102, and for providing a return path for messages from the subscribers 102. As shown in FIG. 1A, trunk line 106, branch lines 112, and drops, such as drop line 110, provide the transport medium between the headend 104 and subscriber terminals 102 within the CATV system. The distribution plant 100 begins with one or more trunk cables 106 that extend from the head end 104. A plurality of branch lines 112 branch off of the trunk cable 106, and a plurality of drop cables 110 branch off of the branch lines 112. The lines serve as feeder cables for delivering the CATV signal to individual subscriber homes and are often coaxial or fiber lines or a combination.

Line extenders, or signal amplifiers, 114 are distributed throughout the cable plant 100 to boost and equalize a transmitted signal and ensure that proper signal strength levels are maintained. At points where the transmission cable divides, signal splitters/combiners 108 are installed. The branch lines 112, split from the splitters 108, extend the distribution region of the CATV network, and the drop lines 110 function as transmission lines to deliver the CATV services to subscribers 102 on the drop line 110.

The amplifiers 114 equalize the signal and boost its amplitude before sending the signal on to the next amplifier. The forward and reverse path amplifiers 114 in the CATV infrastructure 100 are capable of bidirectional amplification and may boost the signal at regular intervals along the cable. Pay-per-view channels are an example of bidirectional CATV services where the subscriber transmits information back to the headend regarding show selection. A frequency agile RF data return transmitter may be included in each subscriber terminal 102 for communicating with the headend 104 by transmitting messages in the return direction of the CATV plant 100. The headend 104 may include a frequency agile RF data receiver 118 for receiving messages transmitted by multiple return transmitters.

As shown in FIG. 1A, the feeder lines 110 may include signal taps 200, which are tapped at specific locations to provide drop lines 119 to the subscribers 102. A tap is a signal coupler which provides an amount of signal energy from the cable to a subscriber. A tap 200 is typically inserted in the coaxial cable 110 at locations along a cable span 110 where the transmitted signal can be provided to one or more subscribers 102 via the subscriber lines 119. The signal taps provide the final distribution of the CATV/RF signals to subscribers 102, typically via coaxial cables 119. The signal taps 200 may be connected to the coaxial cable 119, e.g., using F-connectors, and may be supported by a cable support strand or a pedestal.

Each subscriber 102 has one or more in-home CATV converter/tuners connected to the subscribe line 119 entering the subscriber's home. The CATV converter/tuner enables the subscriber to select one of a plurality of CATV signals (channels) available on the drop line 110. The CATV service company enables the in-home CATV converter to allow the subscriber to view those TV channels to which he or she has subscribed.

Figure 1B:
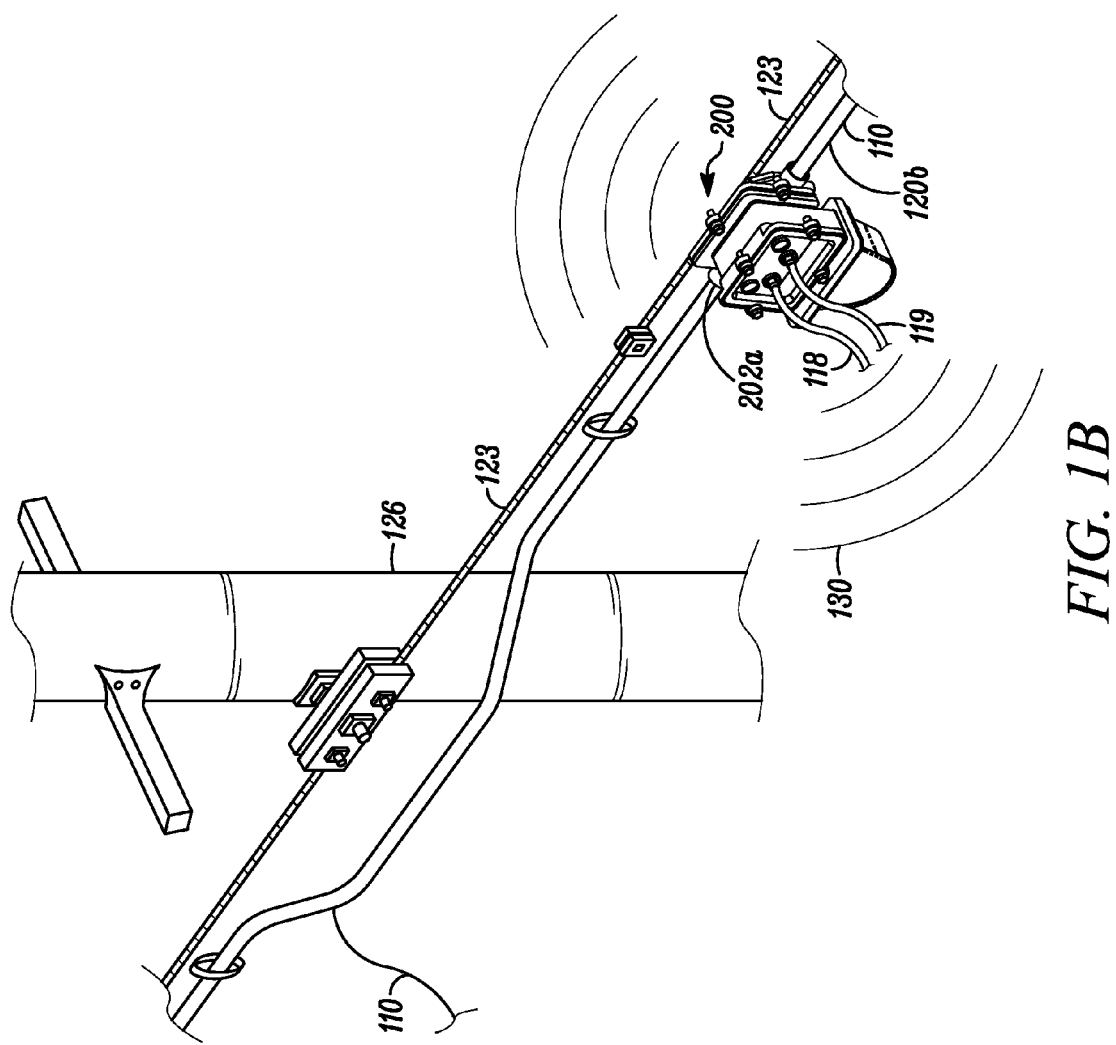
FIG. 1B depicts an example of an existing tap installed in a CATV network with a WiFi access point integrated with the tap.

FIG. 1B depicts an example of an existing tap installed in a CATV network that has been modified by a WiFi extension module. As shown in FIG. 1B, the CATV cable 110 is a feeder cable branched off of at least one trunk cable 106 (as shown in FIG. 1A) connected to a head end 104. The cable 110 feeds the input coaxial cable connector 202a on the signal tap 200. There are numerous ways to install a tap at locations within the CATV network. In the embodiment shown in FIG. 1B, the signal tap 200 is hung by a support strand 123 affixed to a utility pole 126. In embodiments, the tap 200 may be affixed directly to the utility pole 126. Subscriber lines 119 are connectable to the tap 200 to deliver CATV services between the signal tap 200 and one or more subscribers 102. Thus, each subscriber 102 receives signals through the individual taps 200 installed along the coaxial cable 110.

Taps are capable of delivering video, telephony, and data over the CATV network. The CATV network provider generally wants each subscriber to receive the same broadband CATV signal sent from the headend 104 at approximately the same signal level. While a tap 200 may support any number of subscribers, the tap is designed to send a prescribed amount of signal energy to a subscriber. The amount of signal energy provided to a subscriber depends on the available signal energy at the tap and a coupling coefficient of the tap. To maintain a desired amount of signal energy to the subscribers in the CATV system, numerous taps may span the CATV plant. For example, a large cable provider may employ a cable distribution network having over 2 million taps; currently, there are over 20 million taps installed nationwide.

The WiFi lines 130 shown in FIGS. 1A and 1B represent a WiFi signal available from each tap 200. The lines 130 are for illustrative purposes only, as the range of the WiFi access point may be lesser, or more than, what is represented by lines 130. Lines 130 are merely used to indicate that tap 200 has WiFi capabilities. For example, the coverage of a single WiFi access point in a tap may extend from hundreds to thousands of feet from the access point location. One or more access points, in different taps 200, may overlap or extend from edge to edge to widen the coverage area of a single access point.

Historically, operators adding WiFi capabilities to a neighborhood have favored options that can serve as many subscribers as possible while deploying only a very few access points. However, these existing solutions require bulky equipment, wide interruptions to service, and expensive stand-alone assemblies that require a new service to the CATV plant. Disclosed herein are approaches that can lessen the effort required for installation, lower costs for installation and repair, and minimize interruptions to service. As disclosed, integrating WiFi access points into taps in the CATV network in the manner disclosed herein enables the WiFi extended tap to provide the CATV/RF signals to subscribers in the feeder line, provide power to the WiFi access point, and maintain power to the coaxial transmission line during installation. In embodiments, the only subscribers impacted during the WiFi access point installation are those directly fed by the tap location undergoing the WiFi upgrade.

A WiFi access point is a device that allows wireless devices to connect to a wired network using WiFi, or related standards. The multiplicity of existing tap locations in CATV networks makes the positioning of new access points extremely versatile for a cable provider. As disclosed, the manner of installing the WiFi access points is unique, as is the manner for providing power to WiFi access point while maintaining power to the tap. As described with respect to FIGS. 2A-2E, disclosed is a CATV network that integrates WiFi access points into taps 200 throughout the CATV distribution plant 100.

Figure 2A:
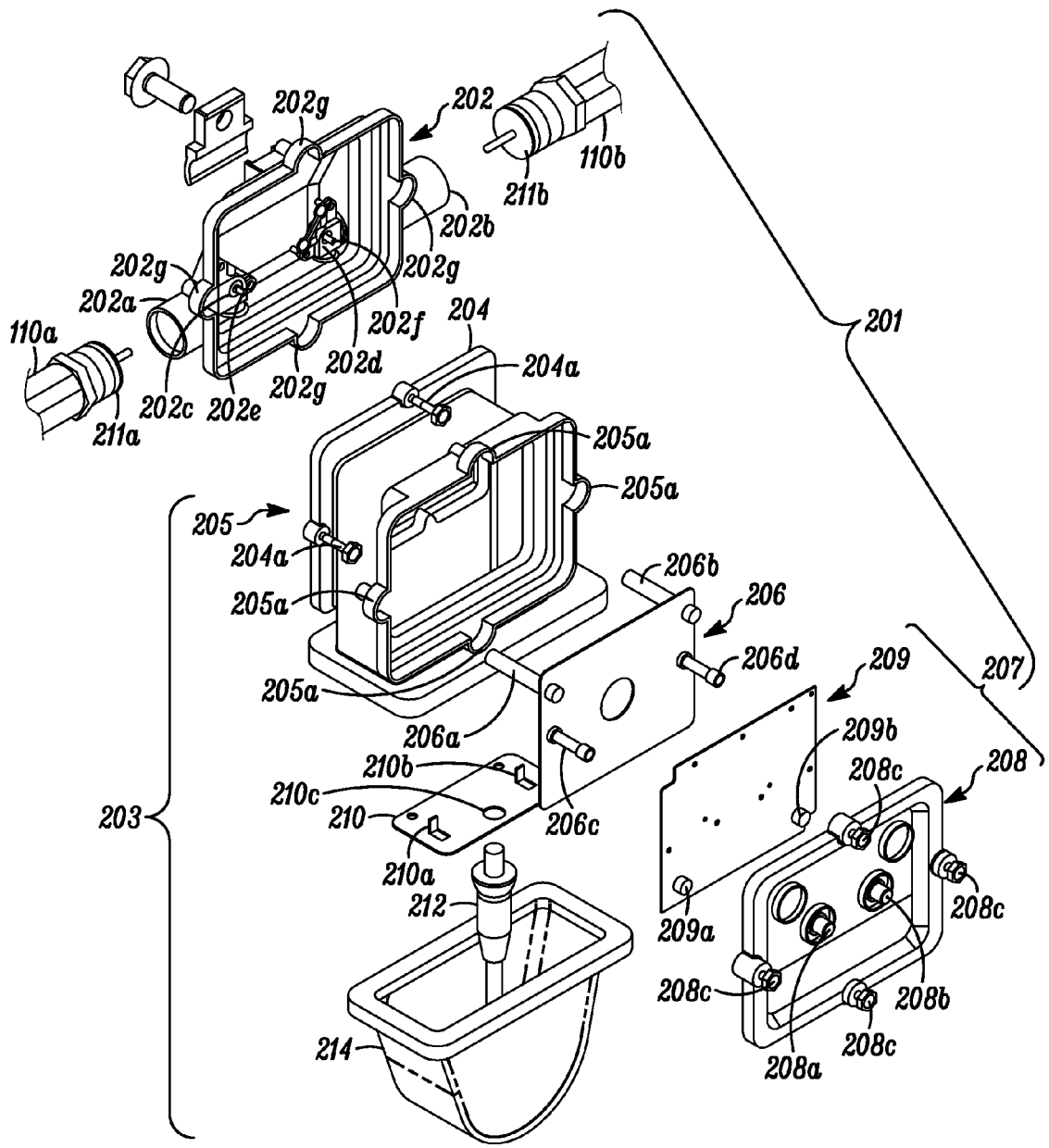
FIG. 2A depicts an exploded front perspective view of a WiFi access point assembly integrated in to a tap assembly.
Figure 2C:
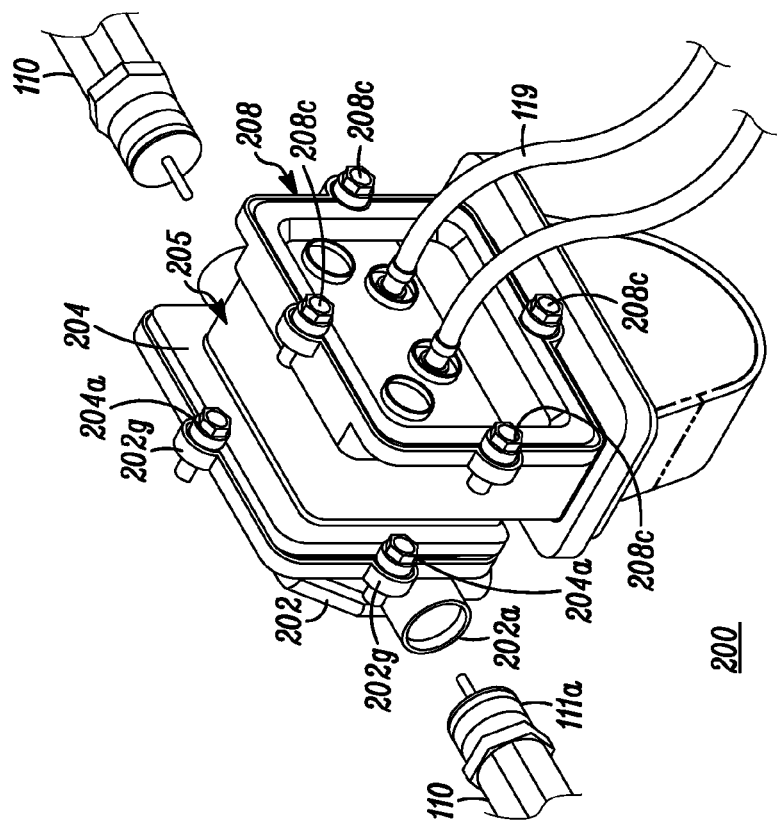
FIG. 2C depicts the WiFi access point extension device and the tap assembly fully assembled.
Figure 2B:
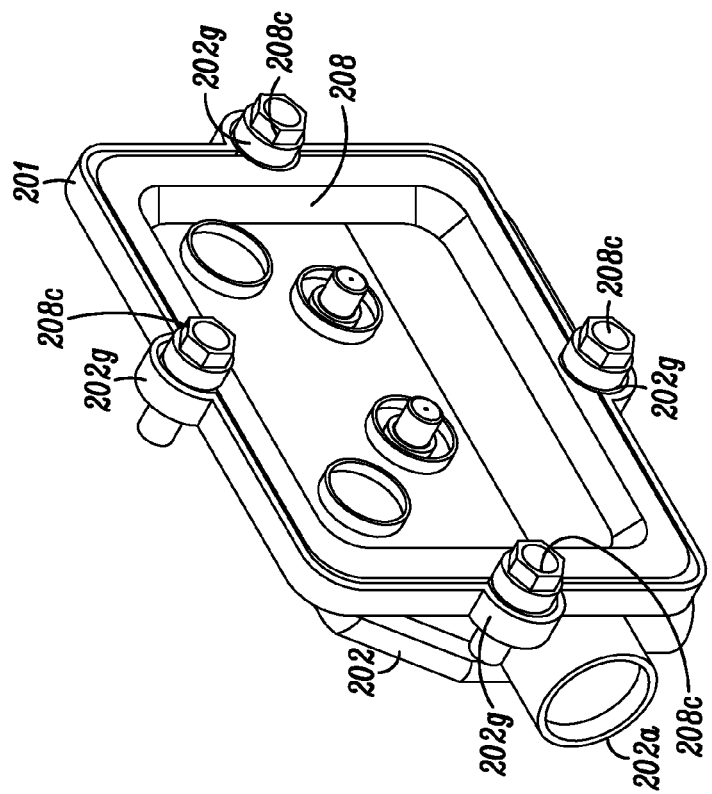
FIG. 2B depicts the tap assembly, depicting the tap cover assembled with the tap housing.
Figure 2D:
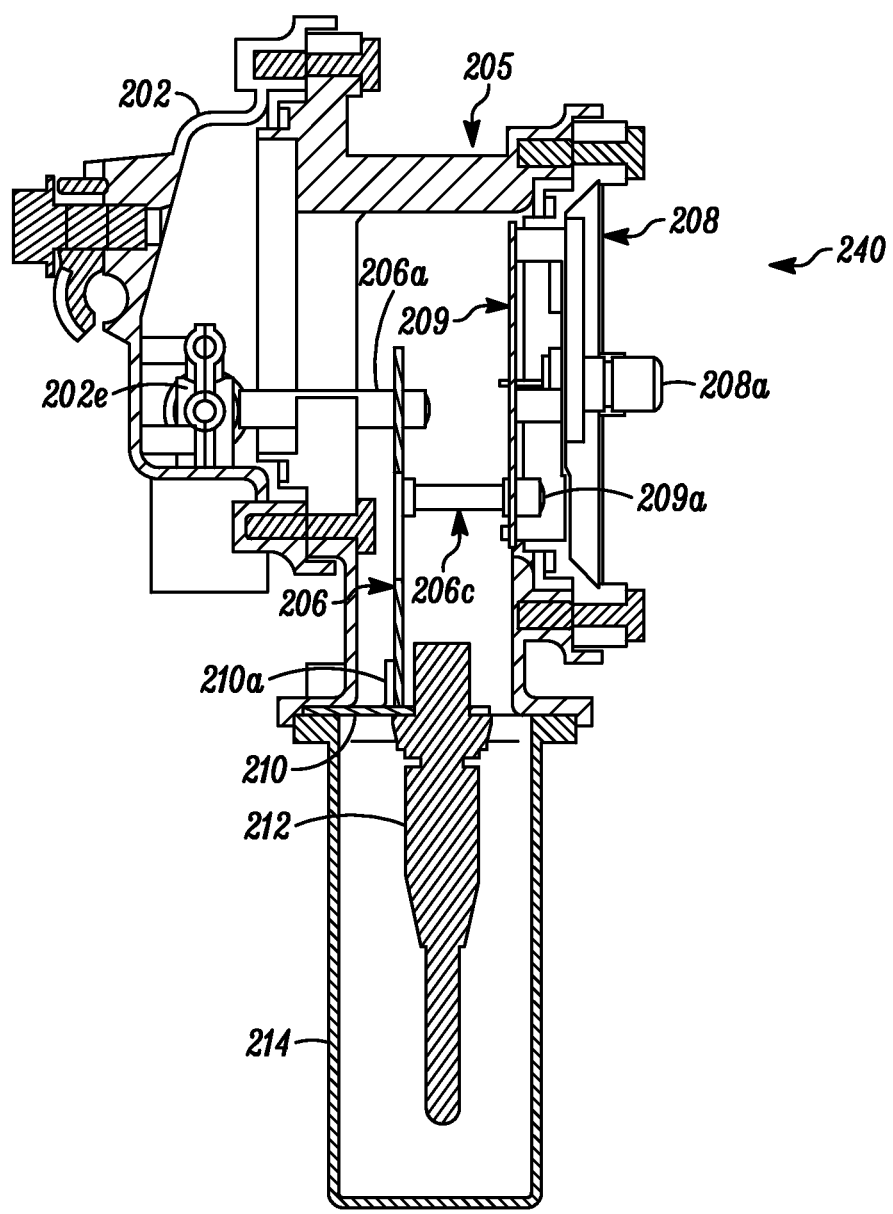
FIG. 2D depicts a cross-sectional view of the WiFi access point extension device and the tap assembly fully assembled.
Figure 2E:
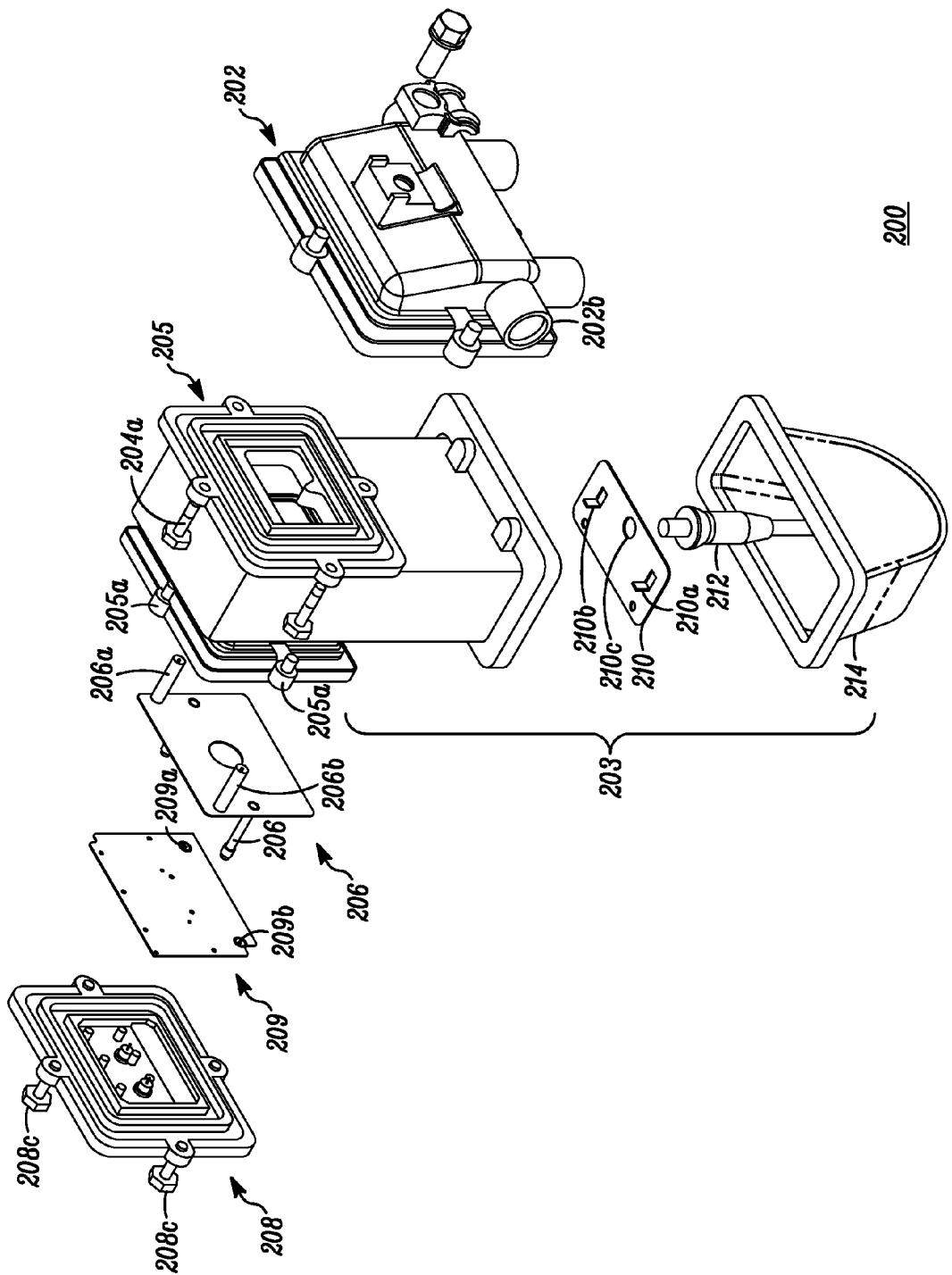
FIG. 2E depicts an exploded, back perspective view of a WiFi access point extension device integrated in to a tap assembly.

FIG. 2A depicts an exploded front perspective view of a WiFi extended tap 200, which includes a WiFi access point extension device 203 integrated in to the tap assembly 201 shown in FIG. 2B. As shown in FIG. 2B, the tap assembly 201 includes a tap cover 208 assembled with the tap housing 202 (without or prior to the installation of the WiFi access point extension device 203). FIG. 2C depicts the WiFi access point extension device 203 and the tap assembly 201 fully assembled. FIG. 2D depicts a cross-sectional view of the WiFi access point extension device 203 and the tap assembly 201 fully assembled. FIG. 2E depicts an exploded back perspective view of a WiFi access point extension device 203 integrated in to a tap assembly 201.

As shown in FIG. 2A, the tap assembly 201 includes a tap cover assembly 207 that is removably connected to the tap housing 202. The tap cover assembly 207 includes the tap cover 208 and a printed circuit board 209 that mounts to the tap cover 208. The WiFi access point extension device 203 is integrated into the tap assembly 201 between the tap housing 202 and the tap cover assembly 207. In embodiments, the module 203 represents an active WiFi picocell access point module containing an antenna, WiFi cable modem, and power supply electronics that can be bolted to an existing HFC tap housing.

The WiFi cable modem provides communication between the cable plant and the WiFi access point extension device 203 and provides communication between the WiFi access point extension device 203 and the wireless user/subscriber. For example, the WiFi cable modem may include a wireless transceiver that provides the communication between the access point and the user via the antenna.

As shown in FIG. 2A, the WiFi access point extension device 203 is made up of an adapter housing 205, a printed wiring assembly (PWA) support bracket 210, an antenna 212, a radome 214, and interface assembly 206. In the embodiment shown, the WiFi access point extension device 203 is inserted between the tap housing 202 and the tap cover assembly 207 via the interface assembly 206, an assembly with both RF and power circuitry in addition to interconnections between the tap housing and faceplate and the antenna connection. Interface assembly 206 is designed to receive power and RF signals from the tap housing 202, and includes a printed wiring assembly. The antenna is electrically coupled to assembly 206 to provide the WiFi RF link. FIG. 2E depicts a rear exploded perspective view of the WiFi extension tap shown in FIG. 2A.

The wireless access point antenna 212 in the wireless access point assembly 205 may be an antenna selected based on gain and directional or omni-directional qualities. Directional antennas may be chosen for concentrating network availability into one particular area, which are useful for regions that are irregularly shaped, for example. Directional antennas have greater gain because their energy is focused in a particular direction rather than being dispersed over 360 degree of azimuth. An omni-directional antenna pattern may offer approximately circular coverage. Often, elevated point to multi-point antennas provide the best coverage for large outdoor areas. The antenna provides two-way RF communication from the access point to the wireless user.

While representative antenna 212 is shown in FIGS. 2A-2E, the WiFi access point extension device 203 may employ more than one antenna, such as a pair of antennas or dual-band antennas. It is possible to improve range by fitting upgraded antennas which have higher gain in particular directions. Outdoor ranges can be improved to many kilometers through the use of high gain directional antennas at the router and remote device(s).

Enclosure 214 may be any suitable enclosure for protecting the antenna 212. Ideally, the enclosure is selected to maximize antenna performance and has suitable dielectric characteristics. For example, a radome is a weatherproof enclosure that may protect the antenna. A radome is usually constructed of material that minimally attenuates electromagnetic signals transmitted or received by the antenna, and also protects antenna surfaces from weather. The enclosure 214 may be constructed in a variety of shapes depending on the size of the antenna or the location in which it will be installed.

As described in more detail below, when the WiFi access point extension device 203 and tap assembly 201 are assembled, an interface 206 (e.g., interface assembly 206) may provide electrical continuity between components in the tap cover assembly 207 and components in the tap housing 202. The tap cover 208 is removably mountable to the adapter housing 205, which in turn is removably mountable to the tap housing 202.

The tap housing 202 includes two input/output connectors 202a, 202b. The two I/O connectors 202a, 202b may be threaded female F-connectors, signal input 202a and signal output 202b, at opposing ends of the tap housing 202 for connection to the CATV distribution cable 110. Shown as a drop line 110 from FIGS. 1A-1B, the distribution cable may be threaded securely to the tap housing 202, at the signal input 202a and signal output 202b, via cable connectors 211a and 211b, respectively. A tap output port 202b may be connected to a next tap in the CATV system by another length of coaxial cable 110b.

The headend 104 of the cable network generates an RF signal and an alternating current (AC) power signal and through the cable plant applies them to feeder cable 110. Thus, the feeder cable 110, connected to the input port 202a of the tap, is able to provide the RF signal and power to the tap 200. The operational power component from the feeder cable 110a is passed to the output cable 110b connected to output 202b. An RF component of the signal received over feeder cable 210 is also passed from the input cable 211a at input 202a to the output 202b.

The tap housing 202 includes seizure posts 202c and 202d. The seizure posts 202c, 202d are secured to the housing 202 and are used to electrically couple the CATV coaxial cable 110 F-connectors 211a and 211b for transmission of the signals from the input 202a to the output 202b. The seizure posts also provide mating engagement and circuit continuity between the tap housing 202 and the printed circuit board 209. As shown in FIG. 2A, the seizure posts 202c, 202d are electrically connected to a pair of symmetric female connectors, 202e, 202f, respectively, protruding beyond an insulating body in the tap housing 202. The connectors 202e, 202f are arranged to engage a pair of electro-conductive signal receptacles, male inputs 209a and 209b, positioned on the printed circuit board 209 to ultimately pass an RF signal to signal tap terminals 208a, 208b.

Shown unmounted from the tap cover 208 in FIG. 2A, the printed circuit board 209 may be rigidly attached to the inside surface of the tap cover 208. The tap cover 208 is provided with a plurality of tap outlets with signal tap terminals 208a, 208b, each providing service to a different subscriber or group of subscribers. In the example shown in FIG. 2A, two tap outlets are shown. Any desired number of output tap outlets may be provided to a practical limit. The signal tap terminals 208a, 208b may be tap "F" ports. The printed circuit board 209 includes a circuit portion including a RF signal coupling element and a RF splitting element. An input signal from feeder cable 110 is split depending on the number of tap "F" ports 208a, 208b. A downstream signal is attenuated by a tap value when accessed by each subscriber through a tap "F" port 208a, 208b.

When the tap is assembled as shown in FIG. 2B, the tap cover assembly 207 is secured directly to the tap housing 202 such that female connectors 202e and 202f of the tap housing 202 can engage the male connectors 209a and 209b on the printed circuit board 209. However, when the WiFi access point extension device 203 is inserted between the tap cover assembly 207 and the tap housing 202 as shown in FIG. 2A, the signal receptors 209b and 209c in existing taps currently installed are not long enough to engage with the seizure posts 202c, 202d.

The WiFi extended tap 200 is designed to preserve existing tap assembly 201 functionality for RF signaling when the WiFi access point extension device 203 is integrated into the tap assembly 201. Interface assembly 206 is coupled to the receptors 209a, 209b on the printed circuit board 209 via posts 206c, 206d. Interface assembly 206 is coupled to the seizure posts 202c, 202d in the tap housing 202 via posts 206a, 206b. Referring to FIG. 2D for additional detail, posts 206a, 206b extend from interface assembly 206 through the adapter housing 205 to the tap housing 202 to engage with the female connectors 202e, 202f of the seizure posts 202c, 202d in the tap housing 202. Posts 206c and 206d also extend from interface assembly 206, in an opposing direction from posts 206a ad 206b, to engage with signal receptors 209a and 209b of the tap cover assembly 207. Thus, interface assembly 206 is configured to extend the electrical reach of receptors 209a and 209b to the seizure posts 202b and 202c when the WiFi access point extension device 203 is integrated by bridging the circuitry in the tap housing 202 to the circuitry in the tap cover assembly 207.

In the tap housing 202, signal I/O port 202a is configured to receive/transmit signals from/to the headend 104 over feeder cable 110a and pass the RF and power components to the seizure posts 202c and 202d. Via posts 206a, 206b, 206c, and 206d, interface assembly 206 is configured to electrically couple the pair of signal receptors 209a, 209b on the printed circuit board 209 to the seizure posts 202c and 202d secured to the tap housing 202. Signal receptors 209a and 209b are wired on the printed circuit board 209 to pass RF signals to signal tap terminals 208a, 208b.

Upon the mounting of the WiFi access point extension device 203 to the tap housing, and the mounting of the tap cover/PCB assembly 207 to the adapter housing 205 of the WiFi access point extension device 203, the pair of signal receptors 209a, 209b are able to communicate with the seizure posts 202c, 202d in the tap housing 202 via interface assembly 206. The signal from feeder cable 110a is routed to the signal tap terminal 209a through the printed circuit board 209 to terminal. The signal receptors 209a, 209b may pass the signal through to the output connector 202b, thereby completing the circuit and maintaining continuity from the input of I/O connector 202a through the printed circuit board 209 to continue distributing the signal to each signal tap 209 and to the output I/O signal port 202b to other downstream subscribers 202.

Since subscriber tap printed circuit boards 209 are usually directional with regards to the location of the headend 104, the signal from input 202a may enter the input receptor 209a and exit the output receptor 209b to output 202b. Further, as described below, when all pieces are mounted, the tap housing 202 also passes operational power and RF signals to both the WiFi access point extension device 203 and the tap cover assembly 207.

Thus, when the WiFi access point extension device 203 is integrated in to the tap assembly 201, the resulting WiFi extended tap 200 is configured to electrically couple the tap cover assembly 207 to the tap housing 202 to distribute RF signals received from the headend 104 over feeder cable 110 to subscribers 102, and from the subscribers 102 back to the headend 104. In this manner, the disclosed WiFi extended tap is still able to provide CATV services to subscribers 102 coupled to the WiFi extended tap 200 in addition to providing WiFi capabilities.

FIG. 2C depicts the WiFi extended tap 200 with the WiFi access point extension device 203 and the tap assembly 201 fully assembled. FIG. 2D depicts a cross-sectional view of the WiFi access point extension device 203 and the tap assembly 201 fully assembled (shown in FIG. 2C).

As shown in more detail in FIG. 2D, the antenna 212 may be inserted through a hole in the PWA support bracket 210 (see 210c in FIG. 2A). A mounting portion 210a and 210b of the support bracket 210 mates to interface assembly 206 and may be secured to hold the antenna 212 and enclosure 214 in place in the adapter housing 205.

Referring back to FIG. 2C, the tap cover 208 may be offset from its original position relative to the tap housing 202, as shown mated without the wireless access point extension module 203 in FIG. 2B. In the embodiment shown, the offset is facilitated by the portion 204 of the adapter housing 205 that is integrally cast on the adapter housing 205. When the tap cover assembly 207 is mated to the adapter housing 205, and then mounted to the tap housing 202, the tap cover assembly is offset from the original positioning of the tap cover relative to the tap housing 202 shown in FIG. 2B. The offset between the tap cover assembly 207 and the tap housing 202 provides space for the WiFi access point extension device 203.

The WiFi extension tap 200 is configured to enable the attachment of the WiFi access point extension device 203 to the tap housing 202 of an existing, pre-installed tap assembly 201. The WiFi extension tap 200 is also configured to enable the reattachment of the existing tap cover assembly 207 without the need to modify either the existing tap housing 202, the printed board 209, or the tap cover 208. Installation of the WiFi access point extension device 203 includes: the removal of the existing tap cover assembly 208, attachment of the WiFi access point extension device 203 to the installed tap housing 202, and the reattachment of the tap cover assembly 207 to the WiFi access point extension device 203.

Tap cover 208, tap housing 202, and the WiFi access point extension device 203 may be mounted (i.e., attached, coupled, secured) to each other via any suitable securing method. In embodiments shown in the Figures, the components of the tap are mounted to each other via mounting bolts inserted and screwed in to connection points.

Figure 3:
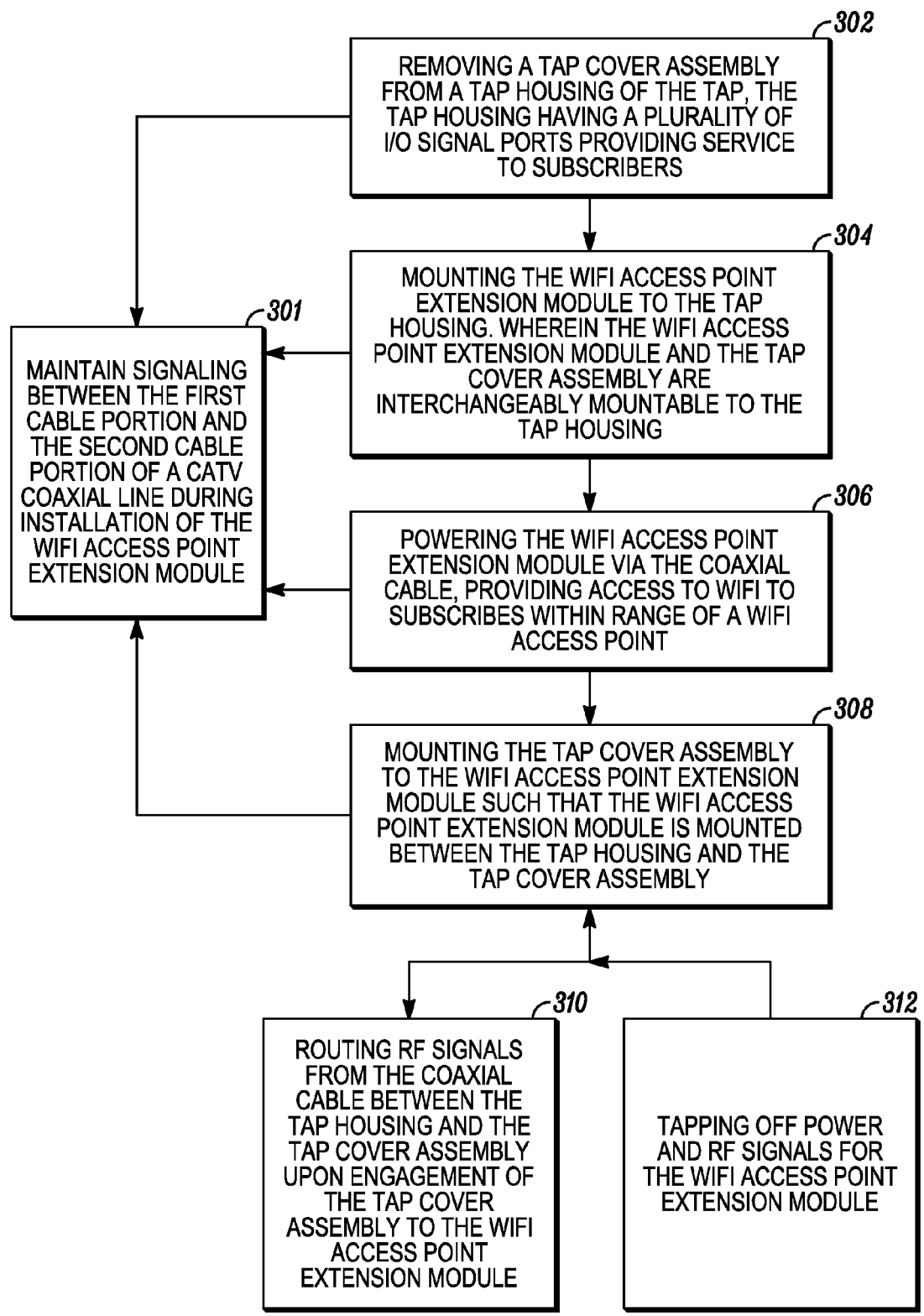
FIG. 3 is a flow diagram illustrating a manner for assembling the disclosed WiFi extended tap.

FIG. 3 is a flow diagram illustrating a manner for assembling the disclosed WiFi extended tap. In particular, illustrated is a method for installing a WiFi access point extension device to a cable television tap that receives and transmits RF signals over a coaxial cable, the tap connected in series between a first cable portion and a second cable portion.

At 302, the tap cover assembly 207 is removed from the tap housing 202 of the tap assembly 201. As shown in FIG. 2B, prior to installation of or after removal of the WiFi extension module 205, the tap cover 208 may be secured to tap housing 202 by a plurality of cover bolts 208c at various connection points 202g. These bolts 208c can easily be removed to disconnect the tap cover assembly 208 (with the printed circuit board 209 mounted) from the tap housing 202.

The tap housing 202 has a plurality of I/O signal ports 202a, 202b, for receiving a respective portion of cable 110. As shown at 301, signaling between the first cable portion and the second cable portion is maintained during installation of the WiFi access point extension device. Prior solutions, such as those that require cutting the coaxial line to insert a stand-alone WiFi assembly, break the RF and power connections to taps farther down the branch of the cable network during installation, thereby causing an interruption of service to potentially many subscribes. It is noted that cutting the feeder line requires the installation of connectors 111a and 111b and breaking connections to the coaxial cable can cause damage to the components of the tap.

During the disclosed methods for installing the WiFi access point extension device 203, the delivery of power and RF signals between signal input 202a and signal output 202b from the feeder cable 110 may be preserved. Thus, during installation, existing power and RF connections to the plant and to subscribers farther down the branch of the cable network are not disrupted.

At 304, the WiFi access point extension device 203 disclosed herein is mounted to the tap housing 202. As shown in FIGS. 2A and 2C, the adapter housing may be mounted to the tap housing 202 following removal of the tap cover assembly 207. Thus, instead of the tap cover assembly 207 mounted to the tap housing 202, mounting bolts 204a of the WiFi access point extension device 203 adapter housing 205 are inserted into the connection points 202g that previously received bolts 208c of the tap cover assembly 207. As illustrated in FIGS.

2A, 2B, and 2C, the tap cover assembly 207 and the WiFi access point extension device 203 are easily interchangeable for connection to the tap housing 202. Thus, the WiFi access point extension device and the tap cover assembly are interchangeably mountable to the tap housing.

As an improvement to prior solutions that employ expensive stand-alone equipment and require an added service to the CATV cable plant (driving up costs for consumers), disclosed are embodiments that draw power for a WiFi access point from the CATV tap. At 306, once the WiFi access point extension device 203 is connected to the tap housing 202, the WiFi access point extension device is able to draw power from the operational power component of the signal from the feeder cable 110. Thus, the WiFi access point extension device can draw power once mounted to the tap housing 202, and begin providing WiFi capabilities to subscribers within range of the antenna 212.

During installation of the disclosed WiFi access point extension device to a specific tap, the signaling circuitry transmitting the RF signal portion that is fed to subscribers of only that specific tap may be broken while the tap cover assembly 207 is detached from the tap. Power and RF signaling is maintained between input 202a and output 202b during installation of the access point extension device 203 i.e., power and RF signaling to other users down the feeder line are not affected during installation. Thus, in embodiments, the RF signaling to the tap cover assembly 207 for delivery over subscriber lines 119 may be interrupted when the tap cover assembly 207 is removed from the tap housing 202, though only affecting subscribers of the single tap. Using the techniques disclosed herein, the feeder cable portion 110b can continue services to taps farther down the CATV plant, passing RF and power components from one cable span 110a to the next 110b during installation of the disclosed WiFi access point extension device 203.

At 308, the tap cover assembly is mounted to the WiFi access point extension device 203 such that the WiFi access point extension device is mounted between the tap housing and the tap cover assembly. As shown in FIG. 2C, after mounting the WiFi access point extension device to the tap housing 202, the tap cover 208 can then be attached to the adapter housing 205 by inserting mounting bolts 208c into connection points 205a. Once the tap cover assembly 207 is mounted to the WiFi access point extension device 203, RF signaling and power to the tap cover assembly 207 resumes, as do the CATV services to the subscribers of that tap.

At 310, interface 206 of the WiFi access point extension device is configured to route RF signals from the coaxial cable between the tap housing and the tap cover assembly upon engagement of the tap cover assembly to the WiFi access point extension device.

As demonstrated by 301, signaling between the first cable portion and the second cable portion is uninterrupted during installation of the WiFi access point extension device. For example, the disclosed techniques provide a manner for installing WiFi access points at tap locations in the CATV plant without requiring splicing in to the coaxial line, thereby minimizing the interruption of service. In particular, the tap housing 202 may stay connected to the feeder cable 110 during installation of the WiFi access point extension device. Because the tap housing 202 can remain connected to the feeder cable 110 during installation of the WiFi access point extension device, the circuitry in the tap housing is able to maintain the delivery of the power component and RF signal portion between signal input 202a and signal output 202b. In embodiments, the seizure posts 202c, 202d in the tap housing 202 can ensure that power to output fiber coaxial cable 110b is not interrupted. In embodiments, a current bypass may be employed to continue powering the tap for the delivery of signals from input signal 202a to output signal 202b.

At 312, the WiFi access point extension device 203 may tap off power to power the access point extension device 203 circuitry. Referring back to FIG. 2A, in embodiments, the signal conveyed by the CATV network has an RF component signal multiplexed with a component that provides operational power. The headend 104 of the cable network generates an RF signal and an alternating current (AC) power signal and through the cable plant applies them to feeder cable 110. The feeder cable is connected to the input port 202a of the tap for delivery of CATV services to subscribers of the tap. Power and RF are on the same line (110). In embodiments, a switch in the tap housing, makes a connection across 202a and 202b when the tap faceplate is removed.

Upon electrically engaging the WiFi access point extension device 203 to the tap housing 202, a component of power from the feeder signal may be provided to power the WiFi access point. It may not be desirable to deliver power to the tap cover assembly (which may be a safety hazard). Using the disclosed techniques, by inserting the WiFi access point extension device 203 between the tap housing and the tap cover assembly, the WiFi extended tap is able to tap off power at the WiFi access point, thereby delivering power to the WiFi access point extension module without delivering power to the tap cover assembly. Upon electrically engaging the tap cover assembly 207 to the WiFi access point extension device 203, the RF component of the cable television signal may be passed to the printed circuit board 209. Thus, when all pieces are mounted, the tap housing 202 passes operational power signal to the WiFi access point extension device 203 passes RF signals to the tap cover assembly. Once the WiFi access point extension device and tap cover assembly are mounted to the tap housing 202 as disclosed herein, CATV services to the subscribers of the tap are resumed.

The ease of integrating the WiFi access point extension device 203 into the tap assembly 201 provides for easier installation and cost savings. For example, no modification to the existing, currently installed tap assemblies 201 are necessary to integrate the disclosed WiFi access point extension device 203. By using existing aspects of the currently installed tap assemblies 201, the WiFi access point extension device can be easily integrated in to the CATV system. Further, it is noted that the WiFi Tap extension module may be constructed of cast aluminum to preserve the RFI/EMI capability of the existing tap.

Also, prior solutions, such as those that require packaging large stand-alone assemblies and splicing on the coaxial line to install them, require an excess amount of manpower for installation, while the disclosed techniques provide a more efficient and convenient manner for installing the WiFi access point that do not interfere with the connection between the housing and the hardlines. Further, the disclosed WiFi extension module attached to the installed tap includes RF and powering connections to the existing transmission line and a WiFi cable model function. Thus, the functionality of the WiFi access point and RF signaling is all inclusive once the WiFi extension module is attached between the tap housing 202 and tap cover assembly 207. Thus, the disclosed WiFi access point extension device and the manner for integrating it in to a CATV system reduces the complexity of WiFi access point installation, preserves RF levels in the cable distribution plant, and allows for a WiFi access point to be added to any tap location.

It is noted that installation of the WiFi access point extension device 203 may involve any separation of components from the tap housing 202 that remains connected to the feeder line 110. For example, installation may involve detaching tap cover assembly 207 from the tap housing 202 from the tap assembly 201 shown in FIG. 2B. The installation may involve disconnecting the tap cover assembly 207 from a WiFi access point extension device integrated with the tap assembly 201, e.g., for repair, or detaching the WiFi access point extension device from the tap housing. As described above, during installation, the tap housing 202 is able to maintain the delivery of the power component and RF signal portion between signal input 202a and signal output 202b. For example, removal of the tap cover assembly 207 does not interrupt the operational power component and RF signaling between signal input 202a and signal output 202b of the tap housing 202.

In embodiments, WiFi access points may be installed at existing tap locations in the CATV plant. For example, CATV systems already have millions of taps installed, some of them Fast Fourier Transform taps. The WiFi access point may utilize the already installed tap locations in the plant to provide the RF and powering connections to the coaxial transmission line. Also referred to as a WiFi access point tap upgrade kit, the WiFi access point extension device 203 allows a simple, low-cost, bolt-on upgrade path to provide local WiFi at currently operating FFT tap locations. Thus, using previously installed taps enable a low cost means for adding a WiFi access point to an already installed CATV outdoor plant, without the need to splice into the existing coaxial transmission line. Leveraging existing tap locations minimizes the installation costs of having to add functionality to power the WiFi access points. This device is designed to be used at CATV plant tap locations which are generally outdoor, utility strand mounted locations. Using existing taps that are ubiquitous provide both HFC tap and WiFi access picocell point The embodiments disclosed are largely described with respect to a cable television (CATV) distribution system. However, the principles set forth herein are generally applicable to other types of broadband networks uses to transport video signals and digital data to users that may be distributed over a wide area. For example, a number of different types of cable television (CATV) communication systems exist to provide a diversity of CATV services. Some portions of the CATV plant may use optical fiber cables instead of coaxial transmission cables.

CATV networks may be implemented with a hybrid fiber coax (HFC) architecture, where fibers carry CATV signals from the CATV headend (i.e., the master facility or coax-cable plant used to receive, process and distribute CATV signals over the CATV network to CATV subscribers) to fiber nodes. For example, the CATV plant 100 may include a hybrid fibre/coax network in which fiber is used to deliver optical signals from the headend 104 to an optical node 117, where the signals are converted to radio frequency (RF) signals and passed through one or more trunk amplifiers 106 and line extenders 114 over a coaxial cable link. The CATV signals may, for example, include radio signals within the range of 5 MHz-1003 MHz or beyond, however other frequency ranges can be used in different systems. The transmission medium for the branch and subscriber drops may be coaxial cable.

While example embodiments for installing a WiFi access point extension device to a CATV tap have been described in connection with various physical arrangements, the underlying concepts can be applied to physical arrangement that provides similar functionality. For example, embodiments are shown for integrating the WiFi access point extension device to a tap that is arranged as tap assembly 201 shown in FIG. 2B. However, taps may have varying physical arrangements. Thus, alternate physical arrangements are contemplated, for integrating the WiFi access point extension device to an existing tap, that maintain a connection between the coaxial line 110 and the tap housing 202 during installation, and provide power to the WiFi access point extension device are contemplated. The alternate physical arrangements may also provide for a disruption of services during installation only to those subscribes of the specific tap.

Different physical arrangements of the tap assembly 201 shown and disclosed herein are also contemplated. For example, the physical arrangement of the WiFi access point extension device, tap housing 202, and tap cover assembly 207 may be different. The WiFi access point extension device may be mounted to the face of the tap, for example, such as mounting the WiFi access point extension device to the tap cover 208. In such a configuration, the interface 206 may be of a different shape and secured in a different manner than what is shown in the Figures. The interface is selected to electrically couple the circuitry in the tap housing 202 to the WiFi access point extension device and to the tap cover assembly, designed to provide power to the WiFi access point extension device attached to the face of the tap and provide RF signaling to the tap cover assembly.

While a system for installing a WiFi access point extension device to a CATV tap has been described in connection with the various embodiments of the various Figures, it is to be understood that other similar embodiments can be used or modifications and additions can be made to the described embodiment for performing the same functions without deviating therefrom. The techniques disclosed should not be limited to any single embodiment, but rather should be construed in breadth and scope in accordance with the appended claims.

Reference throughout this specification to one embodiment, an embodiment, an example embodiment, an example, or similar language means that a particular feature, structure, or characteristic described in connection with the embodiment is included in at least one embodiment of the present techniques disclosed. Thus, appearances of the phrases in one embodiment, in an embodiment, an example embodiment, an example, and similar language throughout this specification may, but do not necessarily, all refer to the same embodiment.

What is claimed:

1. A method for installing a WiFi access point extension device to a cable television tap that receives and transmits radio frequency (RF) signals over a coaxial cable, the tap connected in series between a first cable portion and a second cable portion, the method comprising:

removing a tap cover assembly from a tap housing of the tap, the tap housing having a plurality of input/output (I/O) signal ports for receiving a respective cable portion;

mounting the WiFi access point extension device to the tap housing, wherein the WiFi access point extension device and the tap cover assembly are interchangeably mountable to the tap housing; and mounting the tap cover assembly to the WiFi access point extension device such that the WiFi access point extension device is mounted between the tap housing and the tap cover assembly, wherein an interface of the WiFi access point extension device is configured to route RF signals from the coaxial cable between the tap housing and the tap cover assembly upon engagement of the tap cover assembly to the WiFi access point extension device, wherein signaling between the first cable portion and the second cable portion is uninterrupted during installation of the WiFi access point extension device.

2. The method of claim 1, wherein the tap is a previously installed tap in a cable television (CATV) distribution plant having active connections between a first CATV cable portion and a second CATV cable portion.

3. The method of claim 2, wherein the WiFi access point extension device is installed without disturbing the active connections between the first cable television (CATV)cable portion and the second CATV cable portion.

4. The method of claim 1, wherein the WiFi access point extension device is installed without splicing the coaxial cable.

5. The method of claim 1, wherein upon mounting of the WiFi access point extension device to the tap housing, power is provided to the WiFi access point extension device via the coaxial cable, providing access to WiFi to subscribers within range of a WiFi access point.

6. The method of claim 1, wherein upon mounting of the tap cover assembly to the WiFi access point extension device, RF signaling from the coaxial cable to subscribers of the tap is resumed.

7. The method of claim 1, wherein the signaling over the coaxial cable that is uninterrupted during installation of the WiFi access point extension device includes both power signaling and RF signaling, and the signaling between the tap and subscribers further down a branch line in a cable television (CATV)distribution plant is maintained during installation of the WiFi access point extension device.

8. The method of claim 1, wherein the tap cover assembly is mounted to the WiFi access point extension device in a position offset from an original position of the tap cover assembly relative to the tap housing.

9. The method of claim 1, wherein the WiFi access point extension device is powered via signaling from the coaxial cable and is configured to tap off power to power access point circuitry.

10. A WiFi extended cable television (CATV) tap for receiving and transmitting radio frequency (RF) signals, the tap connected in series between a first CATV cable portion and a second CATV cable portion, the tap comprising:
a tap housing having first and second input/output (I/O) signal ports for securing a respective portion of the CATV cable; and
a WiFi access point extension device and a tap cover assembly that are interchangeably mountable to the tap housing,
wherein signaling between the first CATV cable portion and the second CATV cable portion is uninterrupted during installation of the WiFi access point extension device, and
wherein the WiFi access point extension device is configured to receive the tap cover assembly and provides an interface to route RF signals between the tap housing and the tap cover assembly upon engagement of the tap cover assembly to the WiFi access point extension device.

11. The WiFi extended CATV tap of claim 10, wherein the tap housing further comprises:
seizure posts secured to the tap housing for transmission of power and RF signals from the first I/O signal port to the second I/O signal port; and
female connectors protruding from the seizure posts arranged to engage a pair of electro-conductive signal receptacles in the tap cover assembly via the WiFi access point extension device interface, the female connectors configured to pass RF signals to the signal receptacles in the tap cover assembly.

12. The WiFi extended CATV tap of claim 10, wherein the tap cover assembly comprises:
a tap cover with a plurality of tap outlets for receiving signal tap terminals, each terminal providing service to a different subscriber or group of subscribers over a connectable subscriber line; and
a printed circuit board mountable to the tap cover, the printed circuit board comprising electro-conductive signal receptacles,
wherein the electro-conductive signal receptacles are arranged to engage seizure posts in the tap housing via the WiFi access point extension device interface for receiving RF signals, the receptacles electrically coupled to the signal tap terminals in the tap cover for passing RF signals over the subscriber line.

13. The WiFi extended CATV tap of claim 10, wherein the WiFi access point extension device comprises an adapter housing, an antenna, an antenna enclosure, and the interface for electrically coupling the tap housing to the tap cover assembly.

14. The WiFi extended CATV tap of claim 10, wherein the interface is a plate comprising:
first posts that extend through an adapter housing of the WiFi access point extension device to the tap housing to engage with female connectors of seizure posts of the tap housing, and
second posts that extend in an opposing direction from the first posts to engage with signal receptors of the tap cover assembly.

15. The WiFi extended CATV tap of claim 10, wherein the WiFi access point extension device includes an antenna electrically coupled to the interface to provide the RF communication between the access point and the wireless user.

16. The WiFi extended CATV tap of claim 15, wherein an antenna enclosure has dielectric characteristics that are compatible with the antenna's capabilities.

17. A WiFi access point extension device for integrating into a cable television (CATV) distribution plant, the WiFi access point extension device comprising:
an antenna configured to provide the desired WiFi coverage;
an adapter housing that receives the antenna, and includes access point circuitry;
a first mounting portion for mounting the adapter housing to a tap housing of a CATV tap connected in series between a first CATV cable portion and a second CATV cable portion of the CATV distribution plant, the tap housing having first and second I/O signal ports for securing a respective coaxial cable connector, wherein a connection between the CATV tap and the CATV distribution plant for receiving and transmitting signals along a feeder line of the CATV distribution plant remains in tact during the mounting of the adapter housing;
a second mounting portion adapted to receive a tap cover assembly, the tap cover assembly configured to receive radio frequency (RF) signals from the CATV distribution plant and transmit RF signals to subscribers of the CATV tap along subscriber drop lines; and
an interface configured to route the RF signals from the CATV distribution plant between the tap housing and the tap cover assembly upon engagement of the tap cover assembly to the WiFi access point extension device, wherein the WiFi access point extension device and the tap cover assembly are interchangeably mountable to the tap housing.

18. The WiFi access point extension device of claim 17, wherein the WiFi access point extension device is configured to receive the tap cover assembly such that the WiFi access point extension device is insertably mounted between the tap housing and the tap cover assembly.

* * * * *